(12) United States Patent
Hartwich

(10) Patent No.: US 9,652,322 B2
(45) Date of Patent: May 16, 2017

(54) USER STATION OF A BUS SYSTEM AND METHOD FOR TRANSMITTING MESSAGES BETWEEN USER STATIONS OF A BUS SYSTEM

(71) Applicant: Robert Bosch GmbH, Stuttgart (DE)

(72) Inventor: Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 141 days.

(21) Appl. No.: 14/394,380

(22) PCT Filed: Apr. 4, 2013

(86) PCT No.: PCT/EP2013/057101
§ 371 (c)(1),
(2) Date: Oct. 14, 2014

(87) PCT Pub. No.: WO2013/152987
PCT Pub. Date: Oct. 17, 2013

(65) Prior Publication Data
US 2015/0082123 A1 Mar. 19, 2015

(30) Foreign Application Priority Data

Apr. 12, 2012 (DE) .......................... 10 2012 205 988

(51) Int. Cl.
*G11C 29/00* (2006.01)
*G06F 11/10* (2006.01)
(Continued)

(52) U.S. Cl.
CPC ........ *G06F 11/1016* (2013.01); *G06F 11/073* (2013.01); *G06F 11/0739* (2013.01);
(Continued)

(58) Field of Classification Search
CPC .............. G06F 11/073; G06F 11/0739; G06F 11/0745; G06F 11/0763
See application file for complete search history.

(56) References Cited

U.S. PATENT DOCUMENTS 6,662,258 B1 * 12/2003 Lukanc ............... G06F 13/4273
710/22
6,775,693 B1 * 8/2004 Adams .................... G06F 13/28
709/213
(Continued)

FOREIGN PATENT DOCUMENTS

| CN | 101286130 A | 10/2008 |
|----|-------------|---------|
| CN | 101292231 A | 10/2008 |

(Continued)

OTHER PUBLICATIONS

International Search Report for PCT/EP2013/057101, issued on Jun. 18, 2013.
(Continued)

*Primary Examiner* — David Ton
(74) *Attorney, Agent, or Firm* — Gerard Messina

(57) ABSTRACT

A user station for a bus system is described and a method for transmitting messages between user stations of a bus system. The user station has a CAN-Controller for reading data of a message to be sent directly from a RAM without buffer storage in a buffer store, and a memory access error detection/processing device for detecting a memory access error of the CAN controller and for processing a detected memory access error.

8 Claims, 6 Drawing Sheets

(51) Int. Cl.
*G06F 11/07* (2006.01)
*G06F 11/30* (2006.01)

(52) U.S. Cl.
CPC ...... *G06F 11/0745* (2013.01); *G06F 11/0763* (2013.01); *G06F 11/0772* (2013.01); *G06F 11/3027* (2013.01)

(56) References Cited

U.S. PATENT DOCUMENTS

| | | | |
|---|---|---|---|
| 7,975,120 B2 | 7/2011 | Sabbatini, Jr. et al. | |
| 8,547,135 B1* | 10/2013 | Yarlagadda | G06F 1/26 323/281 |
| 9,250,299 B1* | 2/2016 | Yarlagadda | G01R 33/0005 |
| 2005/0229020 A1 | 10/2005 | Goodman et al. | |
| 2012/0074770 A1* | 3/2012 | Lee | B60T 8/172 303/20 |

FOREIGN PATENT DOCUMENTS

| | | |
|---|---|---|
| JP | 2007228338 A | 9/2007 |
| JP | 2008519355 A | 6/2008 |
| WO | 2005091757 A2 | 10/2005 |
| WO | WO2006/040014 | 4/2006 |

OTHER PUBLICATIONS

Nn: "Core1553BBC MIL-STD-1553B Bus Controller", Jan. 2005, pp. 1-30.
Nn: "Signal.h—Signals", The Open Group Base Specifications Issue 6, IEEE Std 1003.1, Jan. 2004, pp. 1-8.

\* cited by examiner

USER STATION OF A BUS SYSTEM AND METHOD FOR TRANSMITTING MESSAGES BETWEEN USER STATIONS OF A BUS SYSTEM

FIELD OF THE INVENTION

The present invention relates to a user station of a bus system and a method for transmitting messages between user stations of a bus system, in which, in particular, memory access errors are able to be resolved.

BACKGROUND INFORMATION

A bus system is known in which messages are transmitted using the CAN protocol, as described in the CAN Specification in ISO11898.

German Published Patent Application No. 100 00 305 describes the CAN (Controller Area Network=Steuereinrichtungsnetzwerk in German) as well as an elaboration of it designated as TTCAN (Time Triggered CAN=Zeit getriggertes CAN in German).

CAN and TTCAN work with a message-based protocol and are used in vehicles, for example. A bus system based on CAN or TTCAN enables all user stations connected to it, such as microcontrollers, to communicate with one another.

In the current CAN protocol (ISO 11898-1) the size of the data field is limited to 8 bytes. Therefore the message memories (mail boxes) of the user stations of the CAN, which may also be designated as hardware CAN modules, are also limited to 8 data bytes. The document "CAN with Flexible Data-Rate, White Paper, Version 1.0", published on May 2, 2011 on Internet page http://www.semiconductors.bosch.de/, introduces a data transmission protocol that is modified with respect to ISO 11898-1 which, among other things, enables an enlargement of the data field as well as a shortening of the bit length for a part of the CAN message after an arbitration has taken place.

The mail boxes may be implemented as RAM (random access memory) or as register cells. In this instance, it is possible to implement the mail boxes in an external RAM. In this case, buffer storage is provided in the user station, in which a complete CAN message is stored before this CAN message is sent via the CAN bus. The CAN message that is to be stored in buffer storage is loaded word-by-word from the RAM. The transmission of the message begins only when the buffer storage is fully loaded. The buffer storage prevents the CAN protocol controller of a user station, during a running transmission, from getting to a point at which it has no valid data bytes available, because, for example, the RAM is reporting a parity error, or because the reading out of the RAM is delayed because of access conflicts.

It is a problem, however, that in the CAN protocol the possibility of a memory access error is not taken into consideration. A termination of the running transmission would be a violation of the CAN protocol and another signaling of the invalidity of the data is not provided.

As a design approach to this problem, currently, for example, a within-CRC checksum or other test data are sent along with the data field, in order to protect the data path within the CAN system This reduces the useful data rate, however, and puts a load on the application software.

SUMMARY

It is therefore an object of the present invention to provide a user station for a bus system and a method for transmitting messages between user stations of a bus system, which take into consideration storage access errors in the CAN bus system and which, in particular, are able to be attained at little reduction in the useful data rate and little loading of the application software.

The object is attained by a user station for a bus system. The user station includes a CAN controller for reading the data to be sent of a message directly from a RAM without intermediate storage in buffer storage, and a memory access error detection/processing device for detecting a storage access error of the CAN controller and for processing a detected memory access error.

Using the user station described, one is able to react to a memory access error according to the protocol using a (standard) CAN protocol controller or a CAN FD protocol controller, the CAN protocol or the CAN FD protocol being modified. Using the user station described, it is avoided that the receiver of a message, which includes invalid data, wrongly takes the invalid data as being valid.

In addition, buffer storage may be saved, since during the running transmission, the message is read directly from a RAM, without using buffer storage. Since, up to now, the buffer memories in a CAN FD controller, instead of 8 data bytes had to supply up to 64 data bytes, by saving in buffer storage, the floor space requirement of a fully constructed CAN ED controller is able to be significantly reduced. This floor space requirement would otherwise be substantially greater than that of a standard CAN controller.

The memory access error detection/processing device for processing the detected memory access error is preferably developed in that it sets an error code. In this instance, the CAN controller is able additionally to carry out a predetermined measure when the memory access error-detecting/processing device has set the error code.

It is possible that the memory access error is a parity error in the RAM or an ECC error or a time-related error or a data consistency error. In this connection, the time-related error may be an error in which a RAM storage word read by the CAN controller was not provided in time, before the first bit of this storage word was to have been sent on a CAN bus of the bus system, and the data consistency error may be an error in which the content of the message is changed by a software while the transmission of the message is under way.

It is of advantage if the predetermined measure is that the CAN controller changes into the bus-monitoring mode and for this the CAN controller is developed for the change into the bus-monitoring mode. With that, the error can be rectified and the useful data rate in the bus system is not impaired.

Alternatively, the predetermined measure may be that the CAN controller, when sending a message, does not interrupt this message by an error section and, further alternatively, by an overload section and for this the CAN controller is developed for interrupting the data section of the message with an error section, or further alternatively an overload section.

According to a further alternative, the predetermined measure may be that the CAN controller, during transmission of a message, sends an invalid checksum, and for this is developed for the unchanged sending of the data section of the message but for sending an invalid checksum in the message.

The user station described above may be a part of a bus system for transmitting messages between user stations, at least one of the user stations described being present. In this instance, the bus system may be developed for transmitting data using the CAN protocol or the CAN-FD protocol.

The object stated before is additionally attained by a method for transmitting messages between user stations of a bus system. The method includes the following steps: Reading, using a CAN controller, of data of a message to be sent directly from a RAM, without storing in a buffer storage, detecting a memory access error of the CAN controller using a storage access error-detection/processing device, and processing a detected memory access error using the storage access error-detection/processing device.

Additional possible implementations of the present invention also include combinations of features or specific embodiments not explicitly mentioned above or below with regard to the exemplary embodiments. In this context, one skilled in the art will also add individual aspects as improvements or supplementations to the respective ba form of the present invention.

BRIEF DESCRIPTION OF THE DRAWINGS

Unless indicated otherwise, identical or functionally equivalent elements have been provided with the same reference numerals.

DETAILED DESCRIPTION

Figure 1:
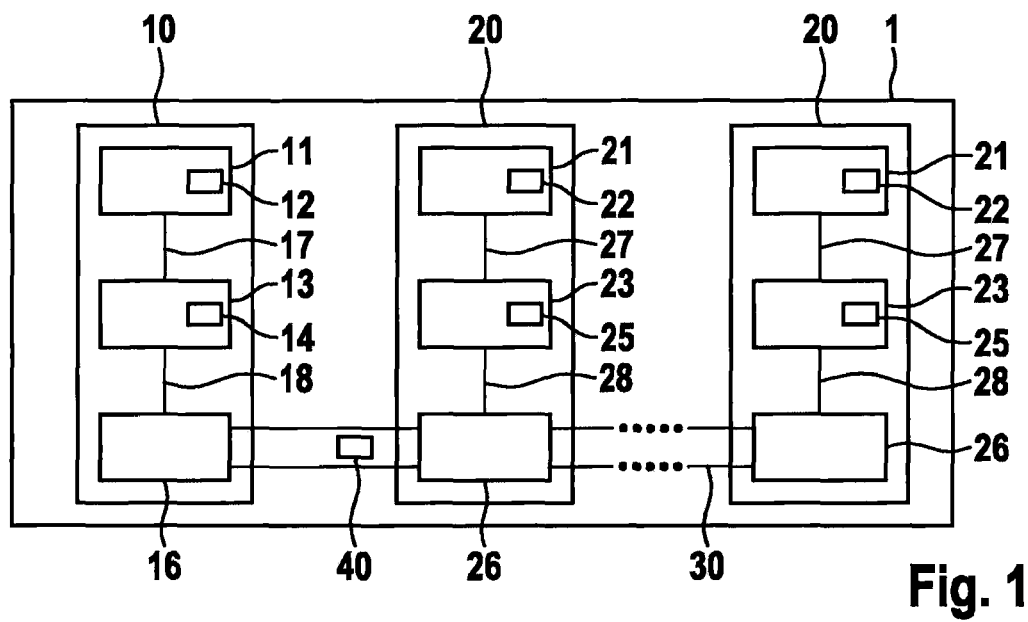
FIG. 1 a simplified block diagram of a bus system according to a first exemplary embodiment.

FIG. 1 shows a bus system 1 which may be a CAN bus system, for example, which may be used in a vehicle, etc., or in a hospital, etc. Bus system 1 has two first user stations 10, a second user station 20 and a bus 30, to which the first and second user stations 10, 20 are connected and via which first and second user stations 10, 20 are each able to send and receive messages 40.

In FIG. 1, first user stations 10 each have a microcontroller 11 having a RAM 12 (RAM=random access memory=memory having random access), a CAN control unit 13, which from here on will be called CAN controller 13, and a buffer store 14, and a CAN transmitting/receiving device 16, which from here on will be called CAN transceiver 16. Microcontroller 11 is connected via a connection 17 to CAN controller 13. CAN controller 13 is connected to CAN transceiver 16 via a connection 18. Data may be exchanged between microcontroller 11, CAN controller 13 and CAN transceiver 16 via connections 17, 18. The data may be messages 40 and/or configuration data, control data and status data to be transmitted via user system 1, or rather bus 30.

In addition, in FIG. 1, second user station 20 has included in it a microcontroller 21 having a RAM 22 (RAM=random access memory=memory having random access), a CAN control unit 23, which from here on will be called CAN controller 23, and a memory access error detection/processing device 25, and a CAN transmitting/receiving device 26, which from here on will be called CAN transceiver 26. Microcontroller 21 is connected via a connection 27 to CAN controller 23. CAN controller 23 is connected to CAN transceiver 26 via a connection 28. Data may be exchanged between microcontroller 21, CAN controller 23 and CAN transceiver 26 via connections 27, 28. As in first user stations 10, the data may be messages 40 and/or configuration data, control data and status data to be transmitted via bus system 1, or rather bus 30.

As may be seen in FIG. 1, only first user station 10 has a buffer store 14. In addition, only second user stations 20 have a memory access error detection/processing device 25. First user stations 10 are thus able to represent a user station which works according to the standard CAN protocol. By contrast, second user station 20 is able to represent a user station which works according to an expanded CAN protocol, as will be described below. The illustration in FIG. 1, which shows a bus system which has both at least one user station 10 according to the standard CAN protocol and also at least one user station 20 according to an expanded CAN protocol, is used for the sake of clarity. The present invention may, of course, also be used in a bus system which includes exclusively user stations 20 according to an expanded CAN protocol, or which does not have any user station 10 according to the standard CAN protocol.

Figure 2:
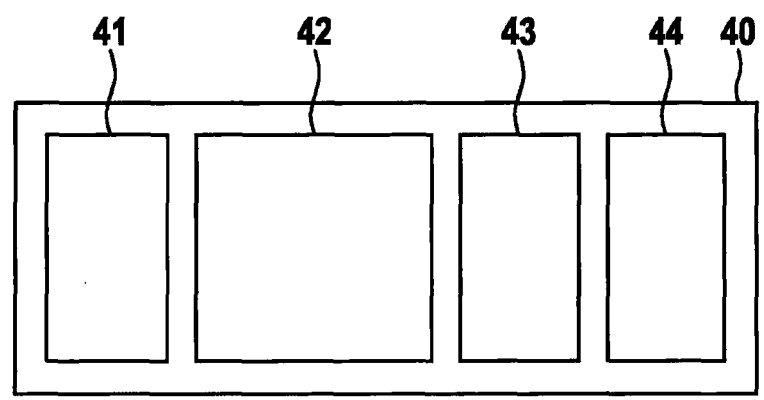
FIG. 2 a simplified block diagram to illustrate the design of a message sent in the bus system according to the first exemplary embodiment.

In a greatly simplified manner, FIG. 2 represents the design of a message 40, as sent via bus 30 by one of user stations 10, 20 in this exemplary embodiment. Message 40 has a design and content according to the CAN protocol. Message 40 message header 41, a data section 42, a checksum section 43 and an end-of-message section 44. Message header 41 includes all the data which, in a message 40 according to the CAN protocol are situated before data section 42, which, in the CAN protocol is also called the data field. Data section 42 includes the data which are required by another user station 10, 20 in bus 30 for its functioning, such as sensor data, state data of the respective user stations 10, 20 etc. Checksum section 43 includes the CRC checksum of message 40, which is also called CRC checksum in the CAN protocol. End-of-message section 44 includes all the data which are situated after the checksum section 43 in a message 40 according to the CAN protocol.

Figure 3:
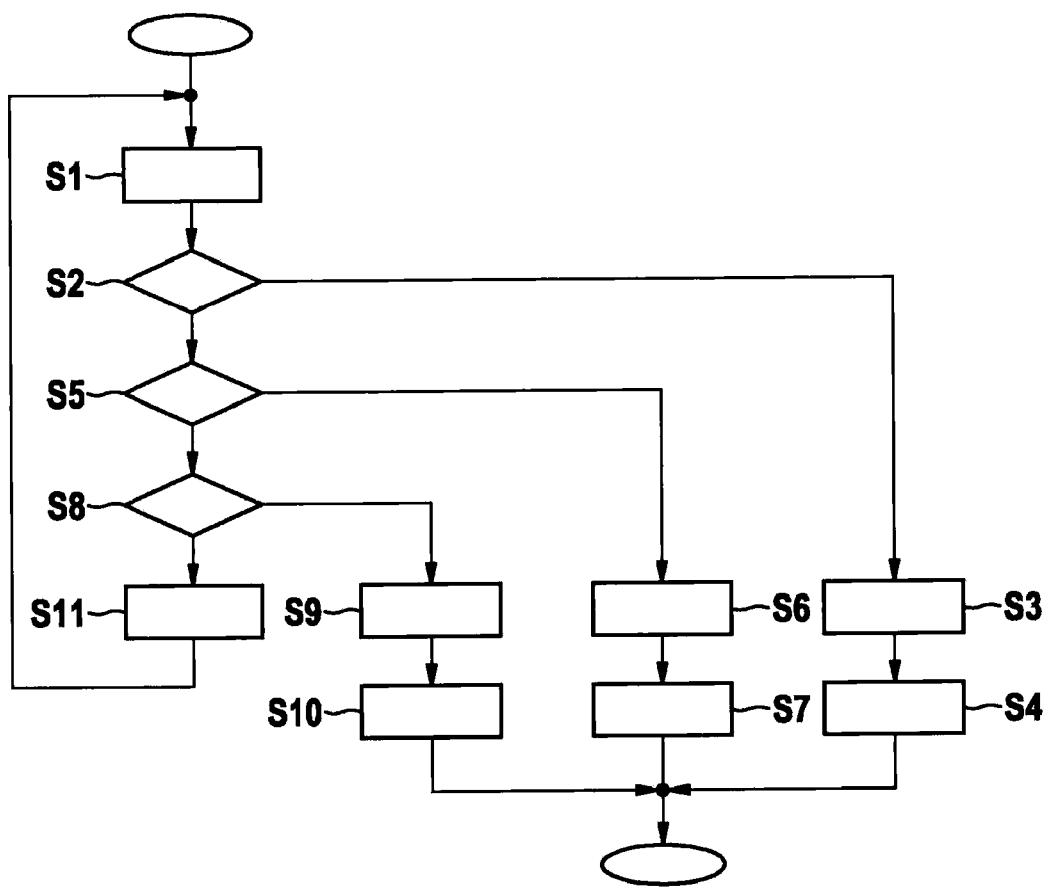
FIG. 3 a flow chart of a method according to the first exemplary embodiment.

FIG. 3 shows the message carried out in each of user stations 20 by CAN controller 23, or stated more accurately, its memory access error detection/processing device 25. After the start of the method, at step S1, the data of a message 40 that is to be sent, i.e. data section 42, are read out, during a running transmission of message 40, directly from message header 41 to end-of-message section 44 from RAM 22, without having been assembled in a buffer store, before the beginning of the transmission. A RAM memory word has to have been read out successfully from RAM 22 at the latest at a CAN bit time before the first bit of this memory word is sent as a part of a message 40, which may also be designated as a CAN frame. After that, the flow continues to a step S2.

At step S2, it is checked by CAN controller 23, or stated more accurately, its memory access error detection/processing device 25, whether a data error, or parity error has been detected in RAM 22. If the response at step S2 is YES, the flow continues to step S3.

At step S3, CAN controller 23, or stated more accurately, memory access error detection/processing device 25 sets an error type provided for this on the error type, which corresponds to the parity error. After that, the flow continues to a step S4.

At a step S4, CAN controller 23, or stated more accurately, memory access error detection/processing device 25, ascertains what the reaction to the parity error should be and/or initiates the predetermined measure provided. At step S4, the predetermined measure is that memory access error detection/processing device 25 has the effect that CAN controller 23 stops sending dominant bits to CAN bus 30. In other words, CAN controller 23 changes into bus monitoring mode. In bus monitoring mode, CAN controller 23 is not able to start a transmission or send dominant bits, but is able to receive all messages 40. Subsequently the method is terminated.

After an error treatment, for instance, by software on the microcontroller, CAN controller 23 is able to be switched back again into an active operating mode, in which CAN controller 23 is also able to start a transmission again and send dominant bits.

However, if the response at step S2 is NO, the flow continues to step S5.

At step S5, it is checked by CAN controller 23, or stated more accurately, by memory access error detection/processing device 25, whether the RAM memory word read by CAN controller 23 will be provided in time, before the first bit of this memory word is sent to CAN bus 30. A providing that is not in time may occur if, for example, several modules, of CAN controller 23, for example, wish to access RAM 22 at the same time. Thus, it is checked whether there is no time-related error present. If the response at step S5 is NO, the flow continues to step S6.

At step S6, CAN controller 23, or stated more accurately, memory access error detection/processing device 25 sets the error type provided to the error type which corresponds to the time-related error. After that, the flow continues to a step S7.

At step S7, CAN controller 23, or stated more accurately, memory access error detection/processing device 25, ascertains what the reaction to the time-related error should be and/or initiates the predetermined measure provided. The predetermined measure at this step S7 is equal to that at step S4. This means that, memory access error detection/processing device 25 has the effect that CAN controller 23 stops sending dominant bits to CAN bus 30.

In other words, CAN controller 23 changes into bus monitoring mode. Subsequently the method is terminated.

However, if the response at step S5 is YES, the flow continues to step S8.

At step S8, CAN controller 23, or stated more accurately, memory access error detection/processing device 25 checks whether the content of message 40 is being changed by a software of user station 20, while the transmission is under way. Such a change is problematic since, because of that the inner data consistency of message 40 is destroyed and there will be a mixture of old and new data bytes in data section 42 of message 40. Thus, it is checked whether there is a data consistency error present. If the response at step S8 is YES, the flow continues to step S9.

At step S9, CAN controller 23, or stated more accurately, memory access error detection/processing device 25 sets the error type provided for this on the error type, which corresponds to the data consistency error. After that, the flow continues to a step S10.

At a step S10, CAN controller 23, or stated more accurately, memory access error detection/processing device 25, ascertains what the reaction to the data error should be and/or initiates the predetermined measure provided. The predetermined measure at this step S10 is equal to that at steps S4 and S7. This means that, memory access error detection/processing device 25 has the effect that CAN controller 23 stops sending dominant bits to CAN bus 30. In other words, CAN controller 23 changes into bus monitoring mode. Subsequently the method is terminated.

However, if the response at step S8 is NO, the flow continues to step S11.

At step S11, CAN controller 23 continues to send unchanged. After that, the flow continues back to step S1.

Of course, the sequence of checking steps S2, S5 and S8 may be permutated optionally in alternative specific embodiments, provided the assignment of the testing (e.g. S2) to the error type determination (e.g. S3) and the measure (e.g. S4) is maintained. This holds true equally for the exemplary embodiments described below.

Accordingly, in this exemplary embodiment, the CAN protocol is changed as follows: On the one hand, a new error type is defined which, for example, is named "data error", and represents the memory access errors described above. On the other hand it is specified what the reaction should be to this "data error". In this way it is possible that a CAN protocol controller 23 terminates a running transmission. Receivers, that is, other user stations 20, have the possibility of detecting this or the erroneous message 40, even if the data are not still further protected, for instance, by an internal CRC in the data field.

Figure 4:
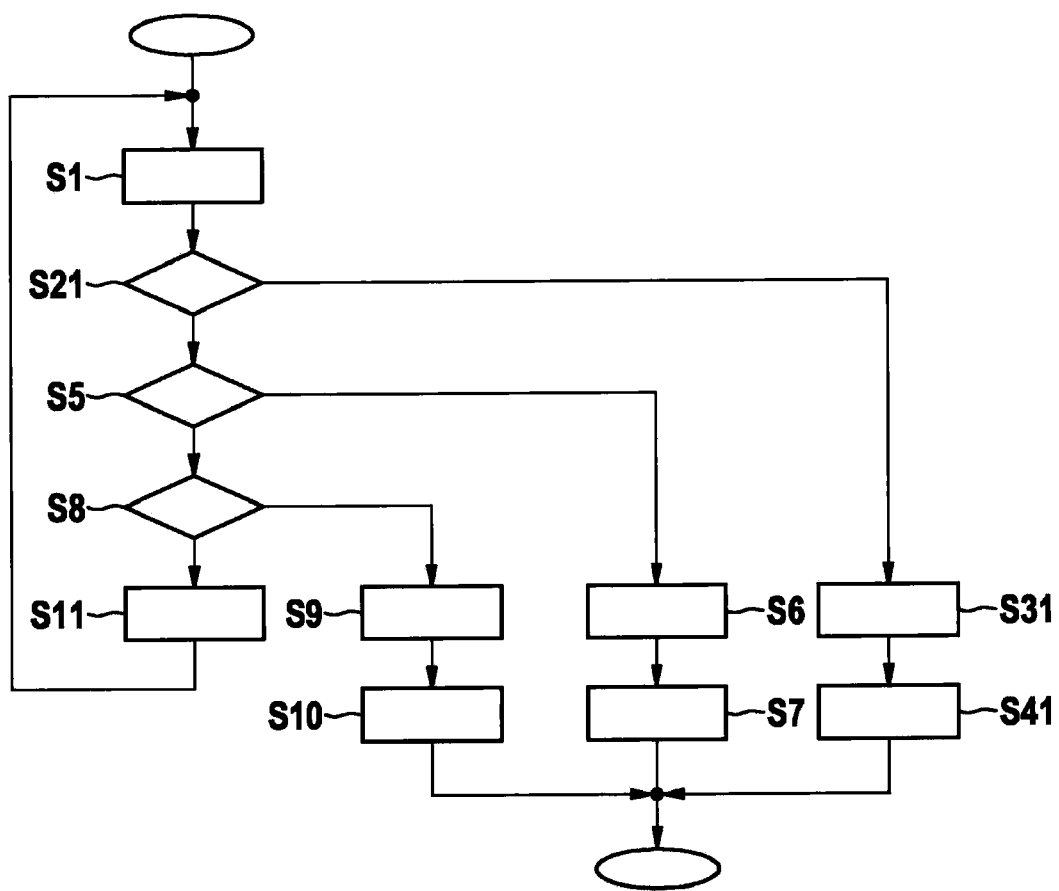
FIG. 4 a flow chart of a method according to a modification of the first exemplary embodiment.

FIG. 4 shows a modification of a method of the first exemplary embodiment, in which, instead of steps S2, S3 and S4 of the method of the first exemplary embodiment, modified steps S21, S31, S41 are carried out.

At a step S21, which is a modified step S2, it is checked whether a non-correctable EEC error (EEC—error correcting code=coding for error correction) has been detected or not. In response to this coding for error correction, for example, 1-bit errors are able to be corrected and 2-bit errors are able to be detected. If the response in this case is YES, the flow continues to a step S31, which is a modified step S3.

At step S31, CAN controller 23, or stated more accurately, memory access error detection/processing device 25 then sets the error type provided for this on the error which corresponds to the ECC error. Thereafter, the flow continues to a step S41, which is a modified step S4.

At a step S41, CAN controller 23, or stated more accurately, memory access error detection/processing device 25, ascertains what the reaction to the ECC error should be and/or initiates the predetermined measure provided. At step S41, the predetermined measure is the same measure as at step S4, namely, that memory access error detection/processing device 25 has the effect that CAN controller 23 stops sending dominant bits to CAN bus 30. In other words, CAN controller 23 changes into bus monitoring mode. Subsequently the method is terminated.

However, if the response at step S21 is NO, the flow continues to step S5. For the further description of the method of this modification of the first exemplary embodiment, we refer to the description of the first exemplary embodiment.

Figure 5:
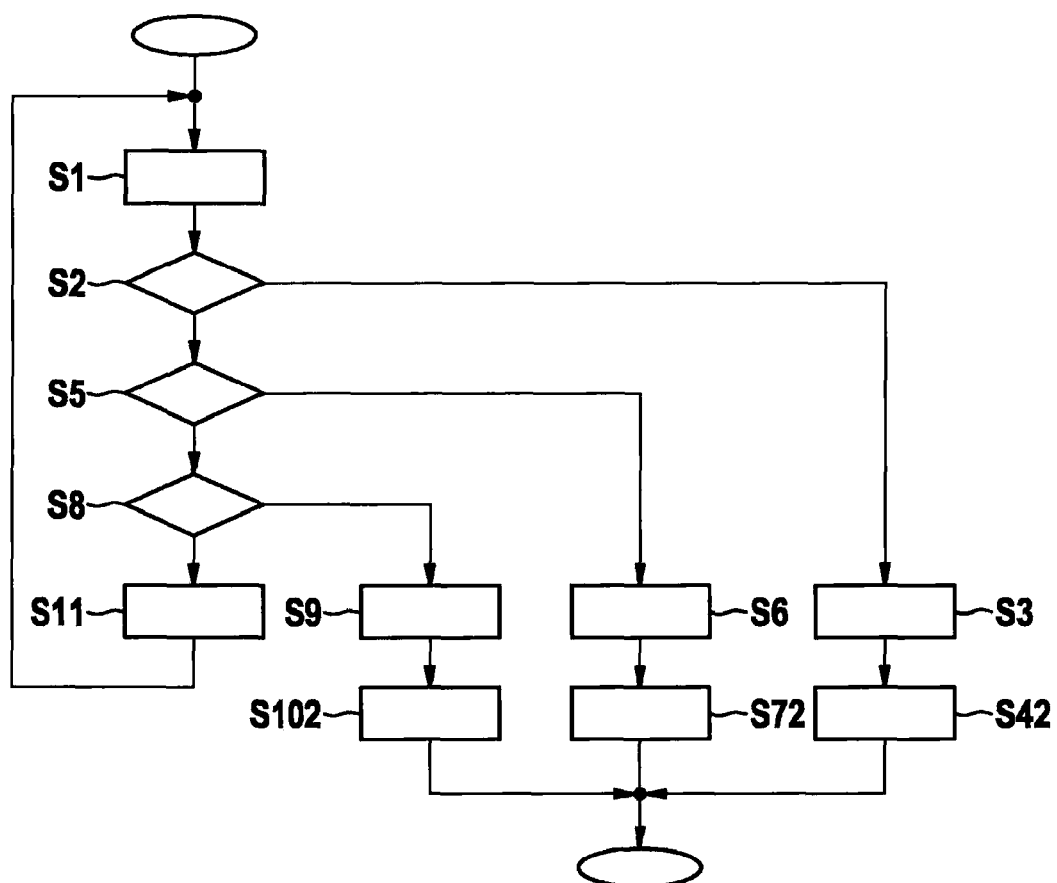
FIG. 5 a flow chart of a method according to a second exemplary embodiment.

FIG. 5 shows a method of the second exemplary embodiment, in which, instead of steps S4, S7 and S10 of the method of the first exemplary embodiment, modified steps S42, S72, S102 are carried out. Accordingly, subsequently only the differences from the first exemplary embodiment are also described with reference to FIG. 6, and as for the rest, we refer to the description of the first exemplary embodiment.

Figure 6:
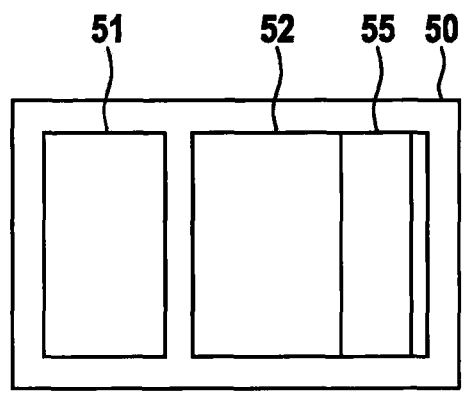
FIG. 6 a simplified block diagram to illustrate the design of a message sent in the bus system according to the second exemplary embodiment in the error case.

In a greatly simplified manner, FIG. 6 represents the design of a message 50, as sent via bus 30 by one of user stations 20, according to the second exemplary embodiment in the error case. Other than that, messages 40 continue to be sent. Message 50 has a message header 51 and a data section 52. In this connection, message header 51 has the same design as message header 41, which has been described in connection with FIG. 2. In addition, however, in this exemplary embodiment, an error section 55 is inserted into data section 52, which is also called an error frame. FIG. 6 illustrates schematically an exemplary position of the error frame within the message. To put it more precisely, data section 52 is not continued subsequent to error section 55, but is terminated. Error section 55 is inserted by CAN controller 23, or stated more accurately, memory access error detection/processing device 25 as predetermined measure at step S42 and/or step S72 and/or step S102 of the method shown in FIG. 5, into data section 42. Other than that, S42, S72, S102 of this exemplary embodiment are the same as steps S4, S7 and S10 of the method of the first exemplary embodiment.

Accordingly, data section 42 is interrupted by error section 45 or terminated or corrupted. However, in this case the useful data rate in bus system 1 may be impaired, since the termination of the transmission does not remove the error, such as poor system design. Therefore, the error will occur again in response to further transmission attempts. For this reason, a change into the bus monitoring mode is preferred, as was described in the first exemplary embodiment and its modification.

Figure 7:
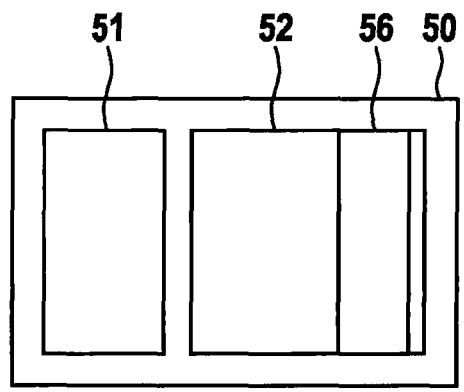
FIG. 7 a simplified block diagram to illustrate the design of a message sent in the bus system according to a modification of the second exemplary embodiment in the error case.

In a greatly simplified manner, FIG. 7 represents the design of a message 50, as sent via bus 30 by one of user stations 20, according to a modification of the second exemplary embodiment in the error case. In contrast to the second exemplary embodiment, in this case, into data section 52, instead of error section 55, an overload section 56 is inserted, which is also called an overload frame. FIG. 7 illustrates schematically an exemplary position of the overload frame within the message. To put it more precisely, data section 52 is not continued subsequent to overload section 56, but is terminated. Consequently, the sending of message 40 is later repeated. In all other aspects, the modification of the second exemplary embodiment is equal to the second exemplary embodiment.

Figure 8:
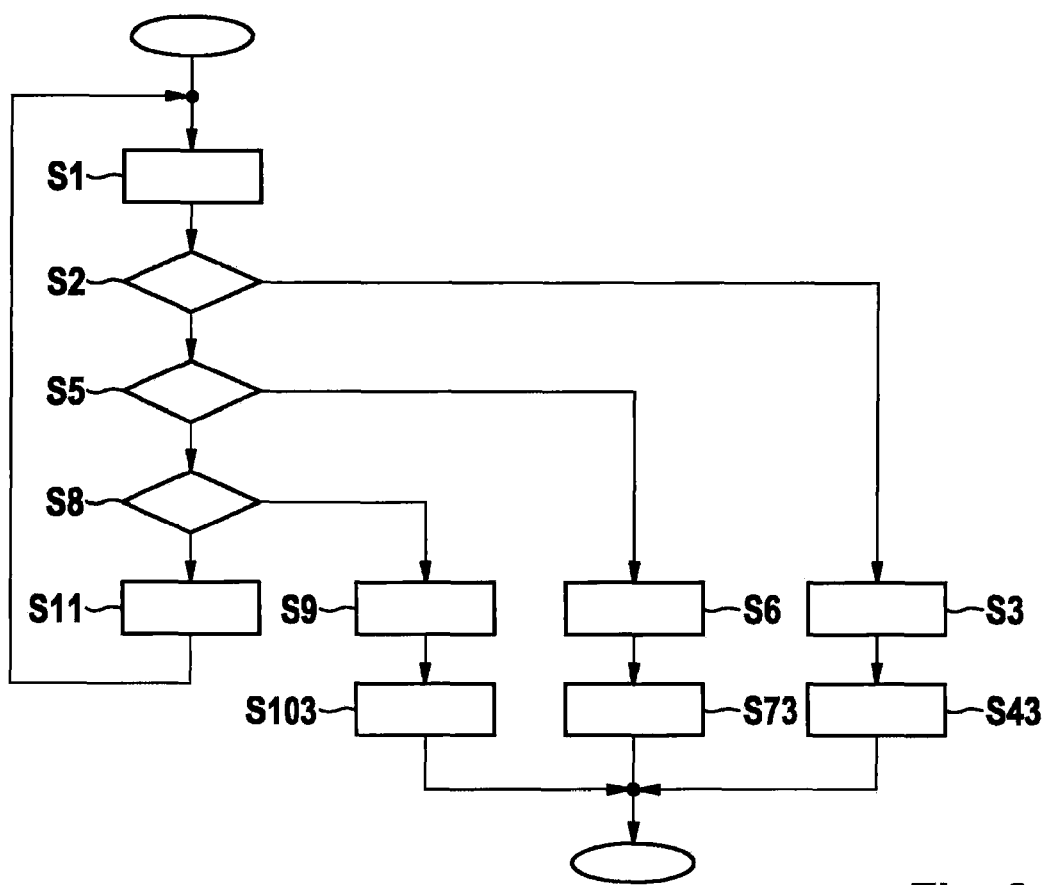
FIG. 8 a flow chart of a method according to a third exemplary embodiment.

FIG. 8 shows a method of the third exemplary embodiment, in which, instead of steps S4, S7 and S10 of the method of the first exemplary embodiment, modified steps S43, S73, S103 are carried out. Accordingly, subsequently only the differences from the first exemplary embodiment are also described with reference to FIG. 9, and as for the rest, we refer to the description of the first exemplary embodiment.

Figure 9:
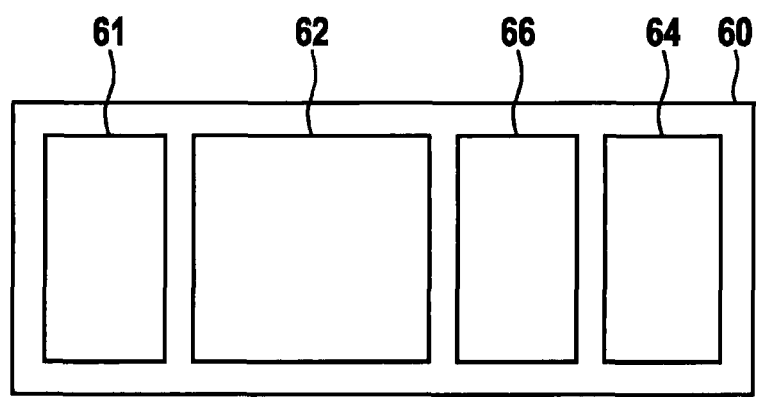
FIG. 9 a simplified block diagram to illustrate the design of a message sent in the bus system according to a third exemplary embodiment in the error case.

In a greatly simplified manner, FIG. 9 represents the design of a message 60, as sent via bus 30 by one of user stations 20, according to the third exemplary embodiment in the error case. Other than that, messages 40 continue to be sent. Message 60 message header 61, a data section 62, a checksum section 66 and an end-of-message section 64. In this case, message header 61, data section 62 and end-of-message section 64 have the same design as message header 41, data section 42 and end-of-message section 44 in the first exemplary embodiment, which are described in connection with FIG. 2. In this exemplary embodiment, however, a corrupted checksum is written into checksum section 66.

This writing of the corrupted checksum into checksum section 66 is carried out by CAN controller 23, or stated more accurately, memory access error detection/processing device 25, as a predetermined measure at step S43 and/or step S73 and/or step S103 of the method shown in FIG. 9. Other than that, S43, S73, S103 of this exemplary embodiment are the same as steps S4, S7 and S10 of the method of the first exemplary embodiment.

In this case too, however, the useful data rate in bus system 1 may be impaired, since a writing of the corrupted checksum does not remove the error, such as poor system design. Therefore, the error will occur again in response to further transmission attempts. For this reason, a change into the bus monitoring mode is preferred, as was described in the first exemplary embodiment and its modification.

All the embodiments of user stations 10, 20 and of the method and of bus system 1 described before may be used individually or in all possible combinations. In addition, the following modifications are particularly conceivable.

Bus system 1 described before is described according to the first to third exemplary embodiment, with the aid of a bus system based on the CAN protocol. However, bus system 1 according to the first to the third exemplary embodiment may also be another type of communications network. It is advantageous, but not an unavoidable assumption, that in bus system 1, at least for certain time periods, exclusive, collision-free access by a user station 10 to a common channel is ensured.

Bus system 1 according to the first through third exemplary embodiment is a CAN network, in particular, or a TTCAN network or a CAN FD network.

The number and the situation of user stations 10, 20 in bus systems 1 of the first through third exemplary embodiments is optional. In particular, user stations 20 may also be present only in the bus systems 1 of the first to the third exemplary embodiment. In this case, all user stations 20 are able to detect invalid messages 40.

RAM 12 and RAM 22 may also be an external RAM, and do not have to be integrated into the respective user stations 10, 20, stated more accurately, into their microcontrollers 11, 21. In this case, the time-related error, whose presence is checked at step S5, is able to occur most probably. On the other hand, if RAM 12 is part of microcontroller 11 and RAM 22 is part of microcontroller 21, the time-related error is less likely.

The predetermined measures in steps S4, S7, S10 of the first exemplary embodiment, in steps S41, S71, S101 of the modification of the first exemplary embodiment, in steps S42, S72, S102 of the second exemplary embodiment and in steps S43, S73, S103 of the third exemplary embodiment may also be different in an exemplary embodiment. They are able to be optionally combined from the measures described in the exemplary embodiments and their modifications.

What is claimed is:

1. A user station or a bus system, comprising:
   a CAN controller for reading data of a message to be sent directly from a RAM without buffer storage in a buffer store; and
   a memory access error detection/processing device for detecting a memory access error of the CAN controller and for processing a detected memory access error, wherein the memory access error is one of a parity error in the RAM, an ECC error, a time-related error, and a data consistency error, wherein the time-related error is an error in which a RAM memory word read by the CAN controller is not provided in time, before a first bit of the RAM memory word is to be transmitted on a CAN bus of the bus system, and wherein the data consistency error is an error in which a content of the message is changed by a software while a transmitting of the message is under way.

2. The user station as recited in claim 1, wherein the memory access error detection/processing device processes the detected memory access error, in that the memory access error detection/processing device sets an error code, wherein the CAN controller carries out a predetermined measure, when the memory access error detection/processing device has set the error code.

3. The user station as recited in claim 2, wherein the predetermined measure is that the CAN controller changes into a bus-monitoring mode, and for this the CAN controller is developed for the change into the bus-monitoring mode.

4. The user station as recited in claim 2, wherein the predetermined measure is, that the CAN controller when sending the message, interrupts the message by one of an error section an overload section, and for this the CAN controller is developed for interrupting a data section of the message with one of an error section and an overload section.

5. The user station as recited in claim 2, wherein the predetermined measure is that the CAN controller, during transmission of the message, sends an invalid checksum, and for this, it is developed for an unchanged sending of the data section of the message but it is developed for sending an invalid checksum in the message.

6. A bus system for transmitting a message between user stations, comprising:
    at least one user station that includes:
        a CAN controller for reading data of a message to be sent directly from a RAM without buffer storage in a buffer store, and
        a memory access error detection/processing device for detecting a memory access error of the CAN controller and for processing a detected memory access error, wherein the memory access error is one of a parity error in the RAM, an ECC error, a time-related error, and a data consistency error, wherein the time-related error is an error in which a RAM memory word read by the CAN controller is not provided in time, before a first bit of the RAM memory word is to be transmitted on a CAN bus of the bus system, and wherein the data consistency error is an error in which a content of the message is changed by a software while a transmitting of the message is under way.

7. The bus system as recited in claim 6, wherein the bus system is developed for transmitting data using one of a CAN protocol and a CAN-FD protocol.

8. A method for transmitting a message between user stations of a bus system, comprising:
    reading, using a CAN controller, of data of a message to be sent directly from a RAM without buffer storage in a buffer store;
    detecting a memory access error of the CAN controller using a memory access error detection/processing device; and
    processing a detected memory access error using the memory access error detection/processing device, wherein the memory access error is one of a parity error in the RAM, an ECC error, a time-related error, and a data consistency error, wherein the time-related error is an error in which a RAM memory word read by the CAN controller is not provided in time, before a first bit of the RAM memory word is to be transmitted on a CAN bus of the bus system, and wherein the data consistency error is an error in which a content of the message is changed by a software while a transmitting of the message is under way.

* * * * *